No. 634,691. Patented Oct. 10, 1899.
N. LANSER.
FILTER.
(Application filed May 29, 1899.)
(No Model.) 2 Sheets—Sheet 1.

WITNESSES:

INVENTOR
N. Lanser.
BY
ATTORNEYS.

No. 634,691. Patented Oct. 10, 1899.
N. LANSER.
FILTER.
(Application filed May 29, 1899.)
(No Model.) 2 Sheets—Sheet 2.
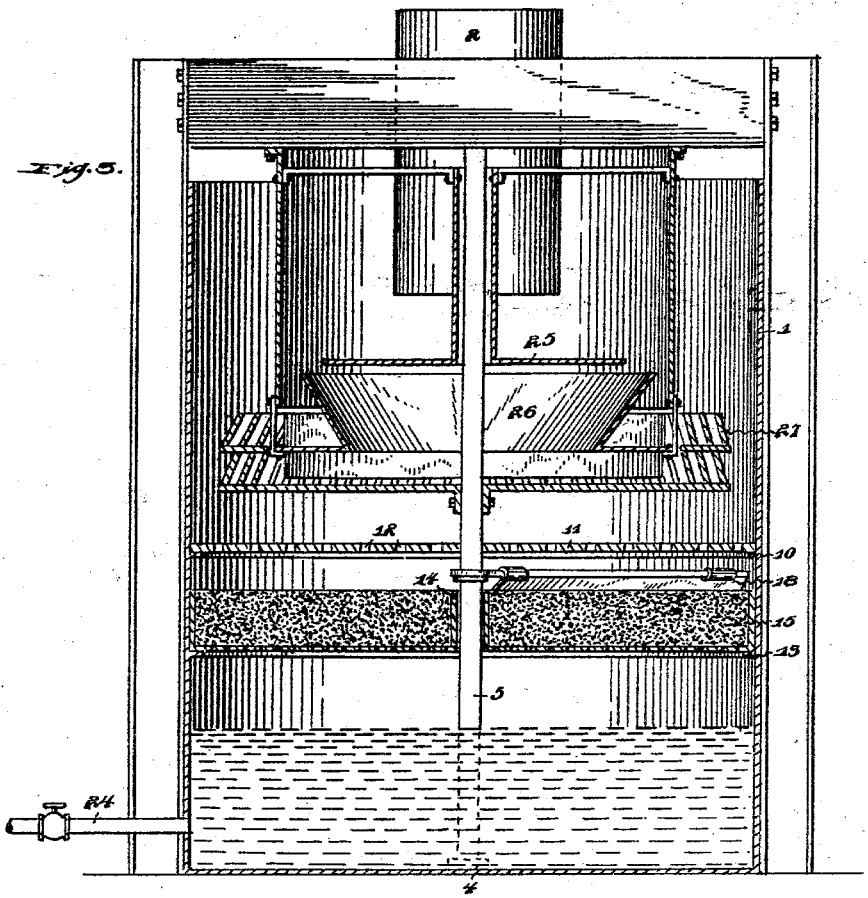
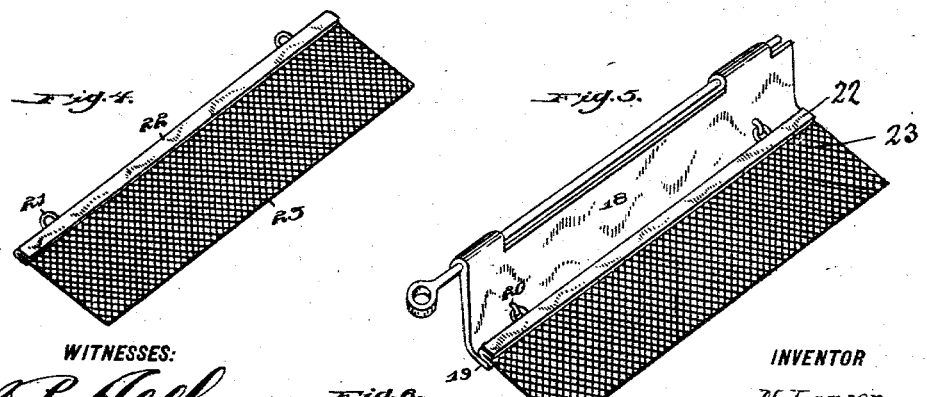
WITNESSES:
INVENTOR
N. Lanser.
BY
ATTORNEYS.

UNITED STATES PATENT OFFICE.

NICHOLAS LANSER, OF ALLEGHENY, PENNSYLVANIA.

FILTER.

SPECIFICATION forming part of Letters Patent No. 634,691, dated October 10, 1899.

Application filed May 29, 1899. Serial No. 718,714. (No model.)

*To all whom it may concern:*

Be it known that I, NICHOLAS LANSER, a citizen of the United States of America, residing at Allegheny, in the county of Allegheny and State of Pennsylvania, have invented certain new and useful Improvements in Filters, of which the following is a specification, reference being had therein to the accompanying drawings.

This invention relates to certain new and useful improvements in filters, and more particularly to that class of filters employed for the filtration of large quantities of water.

The invention has for its object to construct a filter of the above-referred-to class that will be automatically operated by the force of the water and provide novel means whereby all the impurities and sediments are removed from the water and also from the filter through suitable channels provided for the purpose.

Another object of my invention is to construct the filter proper of a mineral felt which possesses advantages in physical and chemical properties over other filtering materials that have heretofore been employed for the purpose. This felt, owing to its capillarity and the compression to which it is subjected when manufactured, is rendered extremely porous and specially desirable for the absorption of all kinds of liquids.

A still further object of my invention is to provide a water-motor that will constantly agitate the water and cleanse the filter when the same is in operation.

With the above and other objects in view the invention finally consists in the novel construction, combination, and arrangement of parts, to be hereinafter more particularly described, and specifically pointed out in the claims.

In describing the invention in detail reference is had to the accompanying drawings, forming a part of this specification and wherein like numerals of reference indicate like parts throughout the several views thereof, in which—

Figure 1:
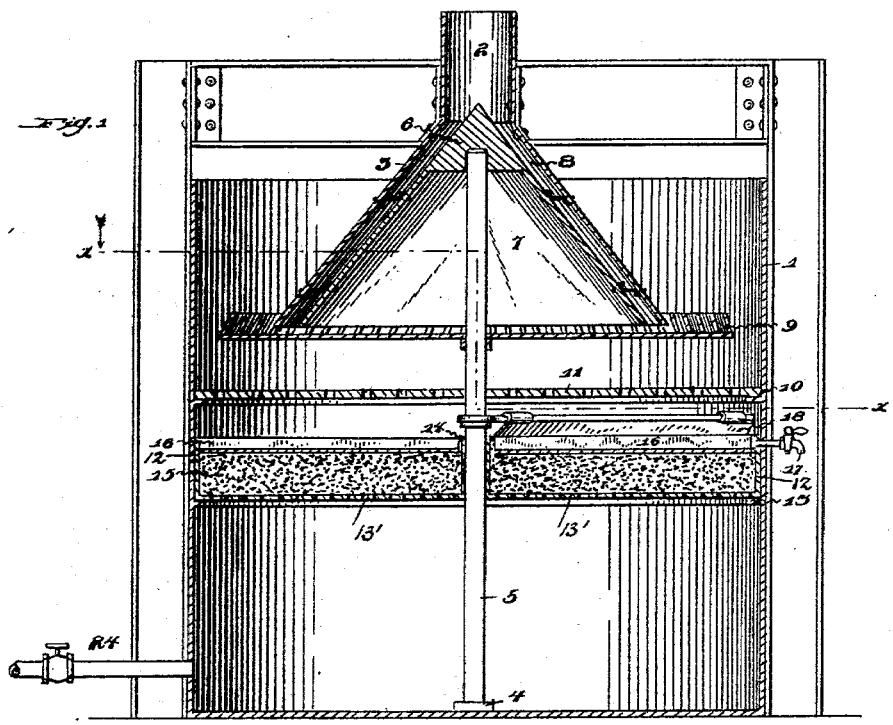
Figure 2:
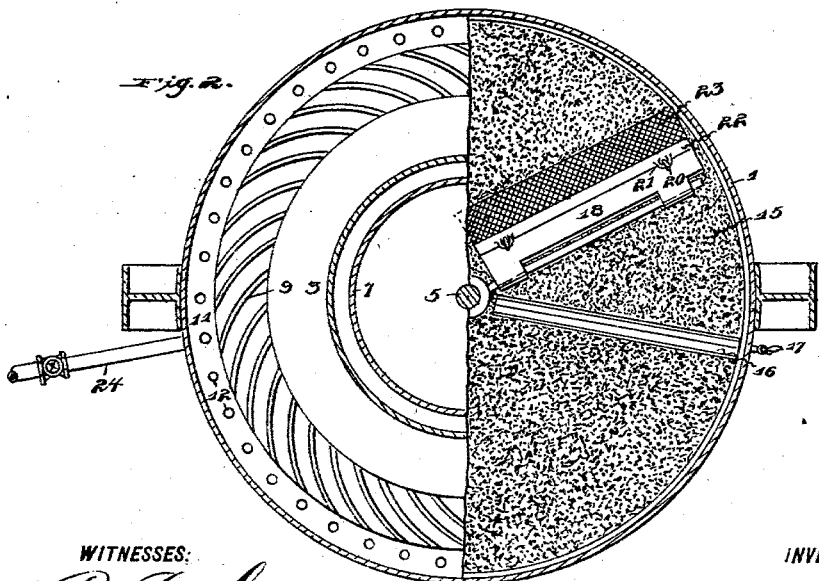

Figure 1 is a vertical sectional view of my improved filter. Fig. 2 is a longitudinal sectional view taken on the line *x x*, Fig. 1. Fig. 3 is a vertical sectional view of a modified form of filter. Fig. 4 is a perspective view of the clamp, having a fabric secured therein. Fig. 5 is a perspective view of the agitator and the clamp secured thereto. Fig. 6 is a perspective view of one of the gutters, which is secured in the filter proper.

In these drawings the reference-numeral 1 indicates a suitable casing forming a reservoir, having communicating therewith a suitable water-inlet 2, to which is secured a funnel 3. Arranged centrally to the bottom of the reservoir is a collar 4, in which is rotatably arranged a shaft 5, the upper end of which operates in a cone 6, said cone carrying a similar funnel 7, having a less diameter than the funnel 3 and forming a water-channel 8 between the outer walls of the funnel 7 and the inner walls of the funnel 3. The funnels 3 and 7 are secured together by means of bolts or other suitable fastening means. Upon the shaft 5, immediately below the funnels 3 and 7 and surrounding the same, is secured a turbine wheel 9.

Secured to the interior walls of the casing 1 is an annular flange 10. This flange is adapted to support a perforated partition 11, having centrally arranged therein an annular opening for the reception of the shaft 5.

12 indicates a suitable receptacle, which is supported by the annular flange 13, formed integral with the inner face of the casing 1. This receptacle 12 is provided with a perforated bottom 13', which is also formed with a centrally-arranged opening registering with the upwardly-extending sleeve 14, through which the shaft 5 rotates.

A mineral felt (indicated by the reference-numeral 15) is placed in the false bottom. In the upper face of the mineral felt are arranged a number of gutters 16, extending radially from the center of the outer edge of the mineral felt. At the outer extremity of the said gutters suitable drain-cocks 17 (only one shown) are provided, which extend through the casing 1.

An agitator 18 is rigidly secured to the shaft 5 between the upper face of the felt and the lower face of the partition. This agitator 18 is set slightly at an angle and carries a lower engaging face 19. On the outer face of the said agitator are secured hooks 20, which are adapted to receive the eyes 21, arranged on the clamp 22, to which is secured the fabric 23. A suitable outlet-pipe 24 is secured on the lower portion of the casing of the water-reservoir.

Referring to the modified form of my improved water-filter, as disclosed in Fig. 3 of the drawings, I have arranged a water-deflector 25 and funnel 26 in lieu of the inverted-cone-shaped funnel. In this modified form I also employ a double turbine wheel 27 as a substitute for the single turbine wheel.

The operation of my improved filter is as follows: The water or other liquid to be filtered being conducted through the inlet 2 will be distributed by the cone in the channel 8, thence to the turbine wheel 9, rotating the same and imparting a rotary motion to the shaft 5, which in turn operates the agitator 18, carrying the clamp 22 and fabric 23, the lower face of the agitator and fabric engaging the upper face of the filtering material and removing the sediments contained in the water into the gutters 16, from where the foreign substance or sediments will be conducted through the drain-cocks 17 to a suitable place of discharge. The water or other liquid to be filtered after passing over the turbine wheel will pass through the perforated partition 11, through the filtering material 15, through the perforated bottom 13' into the water-reservoir formed in the casing, from where it will be conducted through the outlet-pipe 24. By this means, as heretofore described, the water will be perfectly clear and thoroughly filtered when it enters the reservoir.

The many advantages obtained by the use of my improved filter will be readily apparent from the foregoing description.

It will be noted that all parts are so constructed that they may easily be taken apart when the occasion requires for replacing the same in case they are broken or to clean the filter.

Particular attention is directed to the fact that various changes may be made in the details of construction of my improved filter without departing from the general spirit of my invention.

Having thus fully described my invention, what I claim as new, and desire to secure by Letters Patent, is—

1. In a filter of the character described, the combination of a suitable casing forming a reservoir, a water-inlet and a water-outlet communicating with said reservoir, an inverted funnel secured to said water-inlet, a similar funnel arranged within said funnel which is of less diameter, a cone secured to the apex of said funnel, a shaft rotatably secured to said cone, a turbine wheel secured to said shaft, a perforated partition arranged in said reservoir, filtering material secured in said reservoir, gutters arranged in said filtering material, a suitable outlet communicating with said gutters, an agitator secured to said shaft, all parts being arranged and operating substantially as shown and described.

2. In a filter, the combination of a casing forming a reservoir, a water inlet and outlet communicating therewith, means arranged in the said reservoir for distributing the inflow of water, a shaft rotatably mounted in the said reservoir, means connected to the shaft operated by the inflow of water for rotating the said shaft, an agitator secured to the said shaft, a receptacle mounted in the said reservoir, and a filtering material suitably arranged in the said receptacle, substantially as set forth.

3. In a filter, the combination of a suitable casing, a water inlet and outlet communicating with the said casing, means arranged in the said reservoir for distributing the inflow of water, a shaft rotatably mounted in the said reservoir, means connected to the said shaft operated by the inflow of water for rotating the said shaft, a perforated partition arranged in the said reservoir, an agitator secured to the said shaft below the said partition, a receptacle provided with a perforated bottom suitably arranged in the said reservoir, and a filtering material arranged in the said receptacle, substantially as set forth.

In testimony whereof I affix my signature in the presence of two witnesses.

NICHOLAS LANSER.

Witnesses:
 JOHN NOLAND,
 WILLIAM E. MINOR.